(12) United States Patent
Marinescu et al.

(10) Patent No.: US 8,072,933 B2
(45) Date of Patent: Dec. 6, 2011

(54) COMBINED HANDOVER OF THE CIRCUIT-SWITCHED (CS) AND PACKET-SWITCHED (PS) RESOURCES

(75) Inventors: Iuliana Marinescu, Espoo (FI); Vlora Rexhepi, Espoo (FI); Rami Vaittinen, Singapore (SG); Guillaume Sebire, Espoo (FI)

(73) Assignee: Nokia Corporation, Espoo (FI)

( * ) Notice: Subject to any disclaimer, the term of this patent is extended or adjusted under 35 U.S.C. 154(b) by 1385 days.

(21) Appl. No.: 11/396,284

(22) Filed: Mar. 30, 2006

(65) Prior Publication Data

US 2006/0239229 A1 Oct. 26, 2006

Related U.S. Application Data

(60) Provisional application No. 60/672,686, filed on Mar. 30, 2005.

(51) Int. Cl.
*H04Q 7/00* (2006.01)
(52) U.S. Cl. ........ 370/331; 370/328; 370/352; 455/436; 455/439
(58) Field of Classification Search .................. 370/331, 370/328, 352; 455/436, 439
See application file for complete search history.

(56) References Cited

U.S. PATENT DOCUMENTS

| | | | |
|---|---|---|---|
| 6,289,008 B1 * | 9/2001 | Sakamoto et al. | 370/331 |
| 6,771,964 B1 | 8/2004 | Einola et al. | |
| 7,864,799 B2 * | 1/2011 | Sachs | 370/466 |
| 2003/0169725 A1 * | 9/2003 | Ahmavaara et al. | 370/352 |
| 2004/0029587 A1 | 2/2004 | Hulkkonen et al. | |
| 2004/0077348 A1 | 4/2004 | Sebire et al. | |
| 2004/0240430 A1 * | 12/2004 | Lin et al. | 370/352 |
| 2004/0248575 A1 | 12/2004 | Rajala et al. | |
| 2004/0259549 A1 * | 12/2004 | Ejzak et al. | 455/439 |
| 2005/0003819 A1 * | 1/2005 | Wu | 455/436 |
| 2005/0208948 A1 * | 9/2005 | Hori et al. | 455/452.1 |
| 2005/0272428 A1 | 12/2005 | Tanabe et al. | |
| 2009/0010247 A1 * | 1/2009 | Stille | 370/352 |

FOREIGN PATENT DOCUMENTS

| | | |
|---|---|---|
| EP | 1562396 | 8/2005 |
| EP | 1603290 | 12/2005 |
| WO | 03/034753 | 4/2003 |

OTHER PUBLICATIONS

3GPP TS 43.055 V6.7.0 (Nov. 2004), Technical Specification, 3rd Generation Partnership Project; Technical Specification Group GSM/EDGE Radio Access Network; dual Transfer Mode (DTM); Stage 2, (Release 6).
Chinese Office Action dated Nov. 22, 2010 in parallel Chinese Patent Application No. 200680010792.4 (24 pages) together with English translation of same (12 pages) (36 pages total).
Chinese Office Action dated Mar. 29, 2011 in parallel Chinese Patent Application No. 200680010792.4 (6 pages) together with English translation of same (8 pages) (14 pages total).

* cited by examiner

*Primary Examiner* — Danh Le

(57) ABSTRACT

The problem of synchronization of the handover of the CS and PS resources to the same target cell during DTM handover is solved without affecting the performance of the CS handover. The mechanism of synchronizing the handover of the PS and CS resources is supported by the following functions: (1) resource indications on the CS and PS handover signalling to indicate to target cell network nodes that the CS and PS handover is ongoing at the same time for the same MS; (2) allocated resources indications on the CS and PS handover signalling to indicate to the source cell nodes that there are resources available in the target cell for CS and PS resources; (3) management of the synchronization of the CS and PS handover in the source and target cell.

36 Claims, 7 Drawing Sheets

COMBINED HANDOVER OF THE CIRCUIT-SWITCHED (CS) AND PACKET-SWITCHED (PS) RESOURCES

CROSS-REFERENCE TO RELATED APPLICATION

This application claims priority from U.S. Provisional Patent Application No. 60/672,686 filed on Mar. 30, 2005.

BACKGROUND OF THE INVENTION

Dual Transfer Mode (DTM) is specified in 3GPP TS 43.055 V6.7.0 (2004-11), $3^{rd}$ Generation Partnership Project; Technical Specification Group GSM/EDGE, Radio Access Network; Dual Transfer Mode (DTM); Stage 2 (Release 6). In this dual transfer mode, where the mobile station (MS) has simultaneous Circuit-Switched (CS) and Packet-Switched (PS) connections, a handover procedure is defined only for the CS resources. The details of a handover of CS resources is being specified for general handover purposes in 3GPP TS 23.009 V6.0.0 (2004-12), Technical Specification, 3rd Generation Partnership Project; Technical Specification Group Core Network; Handover procedures (Release 6).

In DTM handover, the PS resources are torn down and only re-established once the MS has successfully completed the handover. The handover of PS resources is being standardized for general purposes in the 3GPP TSG (Technical Specification Group) "GERAN" (GSM (Global System for Mobile Communication) EDGE (Enhanced Data Rates for GSM Evolution) Radio Access Network) in the technical specification 3GPP TS 43.129 v6.0.0 (2004-11), $3^{rd}$ Generation Partnership Project; Group GERAN, Packet-switched handover for GERAN A/Gb mode; Stage 2 (Release 6).

FIG. 1 of TS 43.129 shows a reference architecture for PS handover in GERAN A/Gb mode including a Core Network (CN) with an MSC connected to a first SGSN via a Gs interface, the first SGSN connected to a second SGSN and to a GGSN via Gn interfaces, the MSC also connected to a PSTN with the first SGSN connected to other networks via a Gp interface, and with the GGSN connected to other networks via Go and Gi interfaces. For the radio access network, a BSS/GERAN is shown connected to the MSC of the CN via an A interface and to the first SGSN via a Gb interface. The BSS/GERAN includes a BSC connected to BTSs by Abis interfaces. One of the BTSs is shown in communication with an MS via a Um (wireless) interface. An RNS (or another BSS) is also shown with an RNC (or BSC) connected to NodeBs each having cells with Uu interfaces also capable of communicating with the MS. The RNC (or BSS) is shown connected to the MSC via an Iu-CS interface and to the second SGSN via an Iu-PS interface. The figure shows both user traffic and signalling on most of these interfaces. It will be understood from the foregoing that in the case of a handover involving both CS and PS resources, there is a longer path for the PS signalling which will take longer than the CS signalling.

As suggested above, the DTM procedures specified in 3GPP TS 43.055 only enable the handover of CS resources, while PS resources have to be (re-)established after the MS's successful access in the new cell.

It has been shown that for such an MS in DTM, the PS service interruption at handover is substantial (3.4 s in the Inter-BSC Inter-MSC Inter-SGSN case, with approximately 2.7 s induced by Routing Area Update procedure). See *PS Service Interruption Estimations for DTM Operation*, 3GPP TSG GERAN #17bis, Edinburgh, Scotland, 12-16 Jan. 2004, Source: Siemens; Tdoc G2-040049, Agenda Item 5.4.6.2.

This interruption is not tolerable for services with stringent delay requirements, e.g., PS conversational video. Thus, the handover in the existing TS 43.055 specification introduces a problematic interruption of the PS service.

While Dual Transfer Mode (DTM) Enhancements have been proposed as a work item for GERAN A/Gb mode in 3GPP Release 6 (see *Reduction of PS service interruption in Dual Transfer Mode in TSG GERAN* #17, Budapest, Hungary, 17-21 Nov. 2003 in Tdoc GP-032548, Agenda item 6.7, see also GERAN Project Scheduling and open issues for GERAN in 3GPP GERAN TSG#22, Cape Town, 8-12 Nov. 2004 (*GP*-042836)), there is still an outstanding need to define improvements enabling combined handover of the CS and PS resources in dual transfer mode in order to minimize the end-to-end delays for real-time PS services. The service interruption required by the real-time PS services is a maximum of 150 ms.

There is no prior art solution enabling combined (parallel or simultaneous) handover of CS and PS resources.

The problem could be circumvented if the handover of the PS resources were to be enabled together with the handover of the CS resources either in parallel or simultaneously.

A problem in enabling the combined handover of CS and PS resources in parallel in DTM is that the CS and PS handover procedures are executed independently of each other and hence there might be a risk that one procedure completes before the other, for example, CS handover is completed prior to the PS Handover completion. This would lead to failing a handover for one of the CS or PS resources in DTM, although there were resources allocated in the target cell, the DTM handover would not be able to be performed. Therefore, there is a need to synchronize the PS and CS handover procedures in the source and target systems, such that the MS in DTM can continue with both the CS and PS sessions after handover at the same time.

BRIEF SUMMARY OF THE INVENTION

A new mechanism is provided, according to the present invention, which facilitates the combined handover of PS resources and CS resources in dual transfer mode. The new mechanism is particularly applicable to an MS in DTM with an ongoing CS service and one or more active PS services.

The new mechanism on combined handover of CS resources and PS resources can be accomplished in two different embodiments:
1. Utilizing the PS handover procedures that are currently being standardized in TSG GERAN [3GPP TS 43.129] and CS handover procedures as defined in 3GPP TS 23.009 in parallel—"CS and PS handover in parallel"
2. Enhancing CS handover procedure defined in 3GPP TS 23.009 to support the handover of the PS resources as well—"simultaneous CS and PS handover".

Above mentioned embodiments are independent of each other.

A basic principle followed, according to the first embodiment of the present invention, is that the CS and PS handover procedures are enhanced to enable the synchronization of the combined handover of the PS and CS resources in DTM.

The new mechanism minimizes the PS end-to-end delays in DTM. The principles of CS and PS handover are utilized to improve the performance of DTM in terms of end-to-end delay. This will not only allow for reducing the PS service interruption of all PS services while in DTM, but in particular for enabling the provision of real-time PS services in DTM.

For an MS in DTM, the combined handover of the PS resources and the CS resources is enabled by either utilizing in parallel the CS handover procedure in 3GPP TS 23.009 and the PS handover procedure as defined in 3GPP TS 43.129 or enhancing the CS handover procedure specified in the above-mentioned 3GPP TS 23.009 to support the handover of the PS resources as well. With this mechanism, the MS will continue with the packet flows in the new cell, provided PS resources are available. In this manner the service interruption will be minimized resulting in a better performance for the PS service while the MS is in DTM. Apart from the enhancements to the CS handover procedure, additional functionality is also needed in the PS domain to enable the resource allocation in the target cell for the PS handover.

An objective is to enable the handover of the CS and PS resources without affecting the performance of the CS handover. The CS handover is not delayed or interfered with due to the handover of PS resources described in both embodiments.

The first embodiment may provide synchronization of the handover PS and the CS resources in the source BSS and in the target BSS. The mechanism of synchronizing the handover of the PS and CS resources in the DTM applies to both CS and PS handover procedures. This mechanism is supported by the following functions:
  resource indications on the CS and PS handover signalling to indicate to target cell network nodes that the CS and PS handover is ongoing at the same time for the same MS;
  allocated resource indications on the CS and PS handover signalling to indicate to the source cell nodes that there are CS and PS resources available in the target cell;
  Management of the synchronization of the CS and PS handover in the source and target cell.

The second embodiment for the simultaneous handover of the CS and the PS resources provided according to the present invention is based on the CS handover procedure defined in 3GPP TS 23.009 with the:
  PS resource indication on the CS handover signalling to indicate to target cell network nodes that the handover of the CS handover and PS resources is ongoing for the MS;
  Additional functionality over the Gb interface (between BSC ad SGSN) and the Gn interface (between SGSNs) in order to allocate PS resources in the target cell; and
  Allocated PS resources indication on the CS handover signalling to indicate to the source cell nodes that there are CS and PS resources available in the target cell.

These and other objects, features and advantages of the present invention will become more apparent in light of the detailed description which follows.

DETAILED DESCRIPTION OF THE INVENTION

As mentioned in the Background section above, the dual transfer mode (DTM) procedures are presently defined in 3GPP TS 43.055 in such a way that, for an MS in DTM, only the CS resources may be handed over. At handover in DTM, the PS resources are released and once the handover is successfully completed, only then are the PS resources re-established in the target cell. As mentioned above, the service interruption is about 3.4 s in the Inter-BSC—Inter-MSC—Inter-SGSN case, with approximately 2.7 s introduced by the Routing Area Update procedure (see the above-mentioned *PS Service Interruption Estimations for DTM Operation in 3GPP TSG GERAN #17bis, Edinburgh, Scotland, 12-16 Jan. 2004, Tdoc G2-040049, Agenda item 5.4.62*). Such delays are not acceptable for real-time PS services.

In order to minimize the end-to-end delays in DTM for the PS services and in particular for the real-time PS data flow, as pointed out above, there is a need for a new mechanism that enables combined handover of the CS and PS resources either in parallel or simultaneously. This invention utilizes the existing PS and CS Handover procedures in order to support either the parallel or simultaneous handover of both PS and CS resources for an MS in dual transfer mode.

"CS and PS Handover in Parallel"—Utilizing Both CS Handover and PS Handover Procedures As mentioned above, there is a problem in enabling the parallel handover of CS and PS resources in DTM in that the CS and PS handover procedures are executed independently of each other. Hence, there is a risk that one procedure completes before the other, for example, CS handover is completed prior to the PS handover completion. This would lead to failing a handover for one of the CS or PS resources in DTM, although there were resources allocated in the target cell, the DTM handover cannot be performed. Therefore, there is a need to synchronize the PS and CS handover procedures in the source and target systems, such that the MS in DTM can continue with both the CS and PS session after handover at the same time. A basic principle followed according to the present invention is that the CS and PS handover procedures will be enhanced to enable the synchronization of the handover of the PS and CS resources in DTM.

PS Indication and CS Indication IEs

Figure 1:
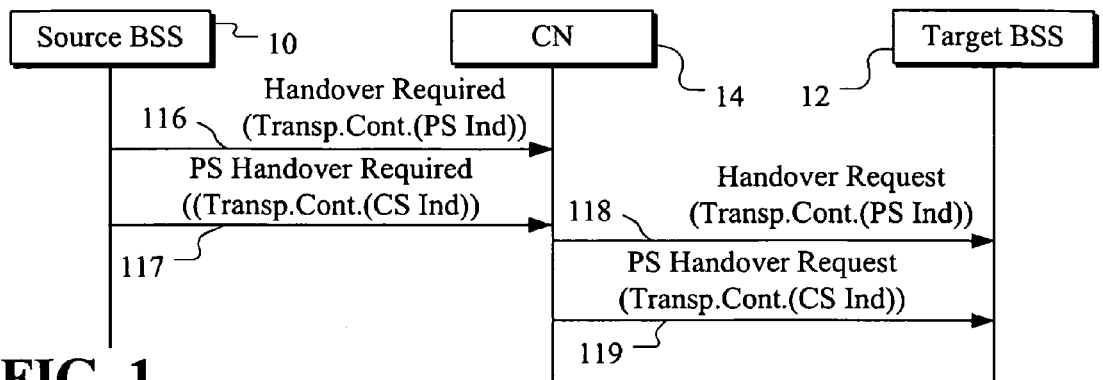
FIG. 1 presents a PS Indication and CS Indication transfer procedure between the source BSS and target BSS via the CN, according to a first embodiment of the present invention.

Referring now to FIG. 1, a PS Indication IE (Information Element) and a CS Indication IE can be provided in parallel, according to the invention, facilitated by synchronization of the handover of both CS and PS resources by synchronizing CS and PS handover procedures.

Two IEs may be used to allow for synchronizing the PS handover and CS handover in the target BSS. These indications are set by a source BSS 10 and only used by a target BSS 12. The target BSS waits for both a HANDOVER REQUEST message on a line 118 and a PS HANDOVER REQUEST message on a line 119 before it sends acknowledgments on lines 130a and 131 (see FIG. 2) to a CN 14:

PS Indication IE is sent (see FIG. 1) in a HANDOVER REQUIRED message (BSS->CN) on a line 116 and the HANDOVER REQUEST message (CN->BSS) on the line 118 within an Old BSS to New BSS transparent container (see 3GPP TS 48.008).

CS Indication IE is sent in a PS HANDOVER REQUIRED message (BSS->CN) on a line 117 and the PS HANDOVER REQUEST message (CN->BSS) on the line 119 within a Source BSS to Target BSS container (see 3GPP TS 43.129).

PS Resources Available IE and CS Resources Available IE

Two additional new IEs are sent to the source BSS 10 (see FIG. 2) by the target BSS 12 in order to synchronize the handover in the backward direction:

PS resources available IE is sent in a HANDOVER REQUEST ACKNOWLEDGE message (BSS->CN) on the line 130a and in a HANDOVER COMMAND message (CN->BSS) on a line 140. The PS resources available IE may be used by an MSC in the CN to indicate to the MS that the data transmission can continue in case of partial PS handover failure.

CS Resources available IE is sent in a PS HANDOVER REQUEST ACKNOWLEDGE message (BSS->CN) on the line 131 and in a PS HANDOVER REQUIRED message (CN->BSS) on a line 141.

Figure 2:
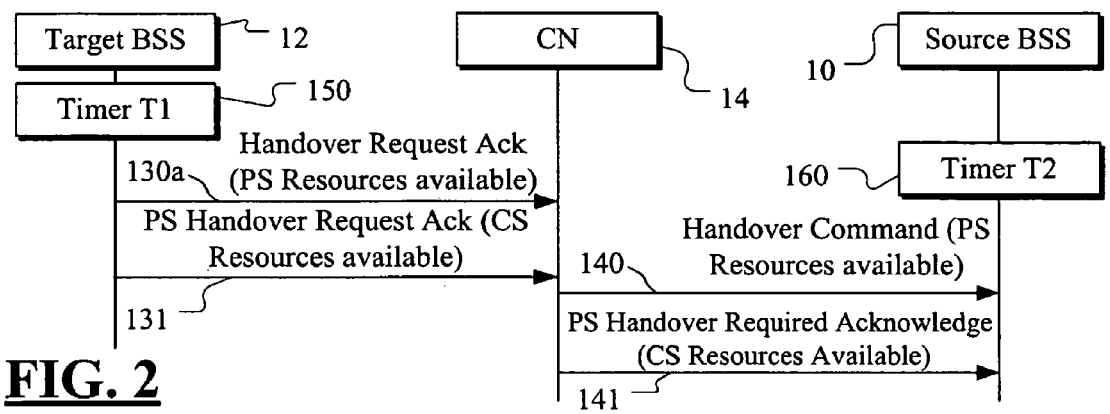
FIG. 2 presents a PS Resource Availability and CS Resource Availability transfer procedure executed between the target BSS and the source BSS via the CN after the procedure of FIG. 1, according to the first embodiment of the present invention.

Source and Target BSS DTM Handover Timers for Management of the Synchronization of the CS and PS Resource Allocation There are two timers defined:

Target BSS timer (T1) 150 (see FIG. 2)

T1 is defined in the target BSS 12.

The purpose of this timer is the management of the CS and PS resource allocation needed for performing DTM handover. The CS handover has priority with respect to PS handover and it shall for example not be delayed due to PS resource allocation, which can be longer than CS handover due to core network signaling in particular, in case of SGSN change. However for a limited amount of time i.e. the duration or value of timer T1, the target BSS can wait for the PS handover signaling in order to prepare the DTM handover information (CS and PS resource availability) for the source BSS and consequently indicate the CS and PS resource availability in the CS and PS handover signaling. The value of the timer T1 should be small such that it does not impact the CS handover performance.

The target BSS has to wait for both handover request messages (HANDOVER REQUEST and PS HANDOVER REQUEST messages on the lines 118, 119) with the CS and the PS information in order to be able to build the transparent containers sent from the target BSS 12 needed by the source BSS 10 to build the information needed for the DTM HANDOVER COMMAND message.

The definition of the timer T1 is given below:

Timer T1

The timer T1 is started upon receipt of the CS handover message indicating DTM handover, i.e. the HANDOVER REQUEST message on the line 118 with the new PS indication IE indicating that PS handover is to happen as well in the target BSS 12.

The timer T1 is stopped at the sending of the last acknowledge message to the CS and PS handover requests, i.e. HANDOVER REQUEST ACKNOWLEDGE message on the line 130a with the new PS resources available IE indicating that PS resources are available or the PS HANDOVER REQUEST ACKNOWLEDGE message on the line 131 with the new CS Resources available IE indicating that CS resources are available messages to the MSC or SGSN correspondingly in the CN.

At the expiry of the timer T1, if PS handover fails (e.g. the target BSS has not received the PS HANDOVER REQUEST message on the line 119 from the SGSN in the CN 14 or it has not enough radio resources), the target BSS shall for example send the HANDOVER REQUEST ACKNOWLEDGE message (with PS Resources available IE indicating that PS resources are not available) on the line 130a to the MSC in the CN 14. In this case only the CS handover continues. The allocated PS resources will be utilized/allocated after the successful access of the MS in the target cell. If the CS handover fails then a HANDOVER FAILURE message (not shown) is sent to the MSC in the CN 14 by the target BSS 12.

The value of the timer T1 shall, e.g., be defined so that CS handover is not delayed too long since it has priority over PS side handover.

Source BSS timer (T2) 160

Timer T2 160 is defined in the source BSS 10.

Figure 4:
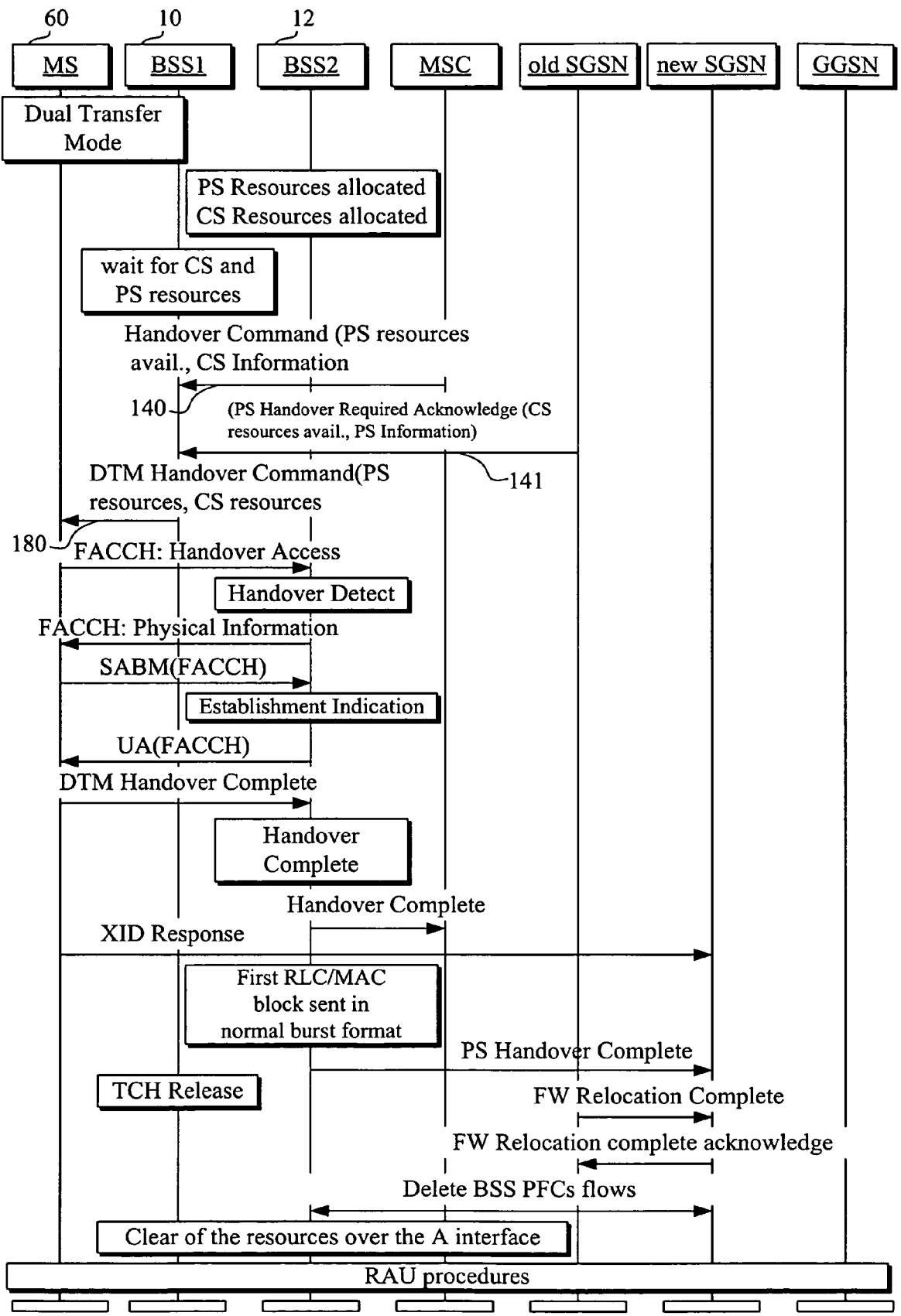
FIG. 4 presents the Inter-BSS, Intra-MSC, Inter-SGSN DTM Handover, NMO I, execution phase including the Handover Commands of FIG. 2, according to the first embodiment of the present invention.

The purpose of this timer is to enable the source BSS to build the DTM HANDOVER COMMAND (to be sent to the MS; see FIG. 4, line 180) based on the information on the CS and PS resource allocation it receives from the target BSS in the messages on the lines 140, 141 in FIG. 2. The CS handover has priority with respect to PS handover and it shall not be delayed because of PS handover, which can be longer due to core network signaling in particular, as already mentioned above, in case of a change in the SGSN. However, for a limited amount of time, i.e., the duration or value of timer T2, the source BSS should wait for the PS handover signaling in order to prepare the DTM HANDOVER COMMAND message on the line 180 for the MS (again, see FIG. 4). The value of the timer T2 should be chosen such that it does not impact the CS handover performance. The value of the timer T2 is larger than the value of the timer T1.

The source BSS 10 has to wait for both handover command messages (PS HANDOVER REQUIRED ACKNOWLEDGE message on the line 141 and HANDOVER COMMAND message on the line 140 in FIG. 2) with the CS and the PS information in order to be able to build the radio interface message DTM HANDOVER COMMAND message for the MS. The definition of the timer T2 is given below:

Timer T2

The timer T2 is started upon receipt of the $1^{st}$ message indicating DTM handover, i.e. either HANDOVER COMMAND message on the line 140 or PS HANDOVER REQUIRED ACKNOWLEDGE message on the line 141 in the source cell.

The timer T2 is stopped when the source BSS has received both HANDOVER COMMAND and PS HANDOVER REQUIRED ACKNOWLEDGE messages on the lines 140, 141.

At the expiry of the timer T2, the source BSS may send again the HANDOVER REQUIRED message on the line 116 and for PS HANDOVER REQUIRED message on the line 117 to the CN 14 to signify the restart of the handover for CS domain or CS and PS domain.

The value of the timer T2 shall be defined so that CS handover is not delayed too long since it has priority over PS side handover.

NOTE: In the above, priority is given to the CS service; however the invention is not restricted to that case.

Second Embodiment—"Simultaneous CS and PS Handover"—Enhancements to the CS Handover Procedure In order to support the simultaneous handover of the PS resources with the CS resources at handover in DTM, according to the second embodiment, the following enhancements are needed to the CS handover procedure:

BSS side

Addition of signalling for provision of PS Information during CS handover, enabling PS handover Indication of PS resource availability in the target cell from the target BSS (Base Station Subsystem) to the MSC (Mobile Switching Center);

Transmission of the Routing Area Code information, old TLLI (Temporary Logical Link Identity) or IMSI (International Mobile Subscriber Identity), from the source BSS to the new SGSN (Serving GPRS Support Node), when SGSN changes;

Management of the CS and PS resources allocation in the source and target BSS.

MSC side

New procedure over Gs interface (between MSC and SGSN) when Gs interface is available in order to indicate the completion of the handover of the PS resources to SGSN.

These enhancements are described in detail below:

PS Information

Figure 5:
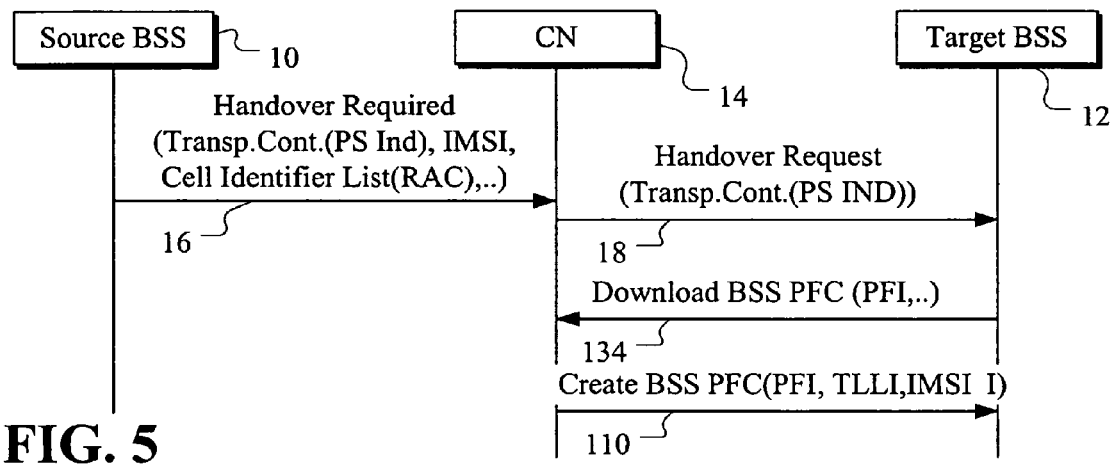
FIG. 5 shows handover of the PS resources with the CS handover, allocation of the CS and PS resources, according to a second embodiment of the present invention.

Referring to FIG. 5, information about the utilized PS resources in a source cell need to be passed from the source BSS 10 to the target BSS 12 (via CN 14) to allow for PS handover to the target cell. This information may be passed transparently through the core network 14, by including a new Information Element (IE) within a HANDOVER REQUIRED message (BSS>CN) on a line 16 and HANDOVER REQUEST message (CN>BSS) on a line 18 used at CS handover.

New procedure to enable SGSN context exchange during handover

In case the SGSN changes at handover, in order to identify the old SGSN from which the SGSN Context is downloaded, the new SGSN needs to know the old Routing Area Identifier (RAI), as well as the identification of the MS through either the old TLLI or IMSI. A new procedure (see FIG. 5) for getting this information to the target BSS is described below:

the old Routing Area Code (RAC) may be passed within the HANDOVER REQUIRED message on the line 16 and the HANDOVER REQUEST message on the line 18 from the source BSS 10 to the target BSS 12 via the CN 14 as part of the target cell identifiers.

the IMSI may be added by an MSC in the CN 14 to the HANDOVER REQUEST message on the line 18 sent to the target BSS 12. Alternatively, the old TLLI information can be sent by the source BSS 10 transparently to the target BSS 12 through the CN 14 by including it in HANDOVER REQUIRED message (BSS>CN) on the line 16 and the HANDOVER REQUEST message (CN>BSS) on the line 18 used at CS handover.

Management of the CS and PS resource allocation

The Target BSS 12 has to wait for the handover message (HANDOVER REQUEST message on the line 18) with the CS and the PS information in order to be able to operate the handover for both CS and PS resources. The Target BSS 12 builds the final HANDOVER COMMAND message on a line 40 (see FIG. 6), which is passed to the source BSS 10 via the CN 14.

Upon reception of the HANDOVER COMMAND message the Source BSS will send it to the MS as a message 180 (see FIG. 8) on the air interface provided that this message has arrived prior to the timer expiry in the source BSS. Source BSS starts the timer after the HANDOVER REQUIRED message has been sent on the line 16 to the CN and stops it after the HANDOVER COMMAND message is received on the line 40 from the CN.

Allocation of the PS Resources

Figure 6:
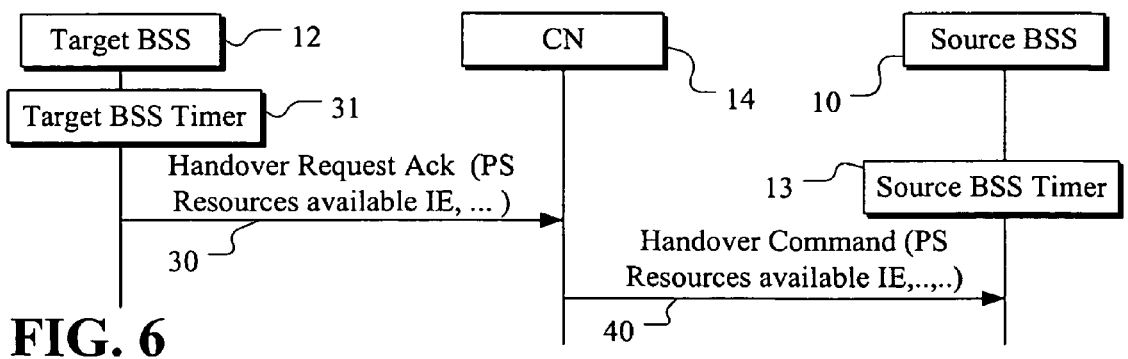
FIG. 6 shows handover of the PS resources with the CS handover in the same time, PS resource availability indication, according to the second embodiment of the present invention.

Referring to FIG. 6, information about the allocated PS resources in the target cell, need to be passed from the target BSS 12 to the source BSS 10 to allow for PS handover to the target cell. This information may be sent as a new IE within a HANDOVER REQUEST ACK message (BSS>CN) on a line 30 and a HANDOVER COMMAND message (CN>BSS) on a line 40 used at CS handover. In case of the change of the MSC this information should be sent between the CN nodes as well.

Figure 8:
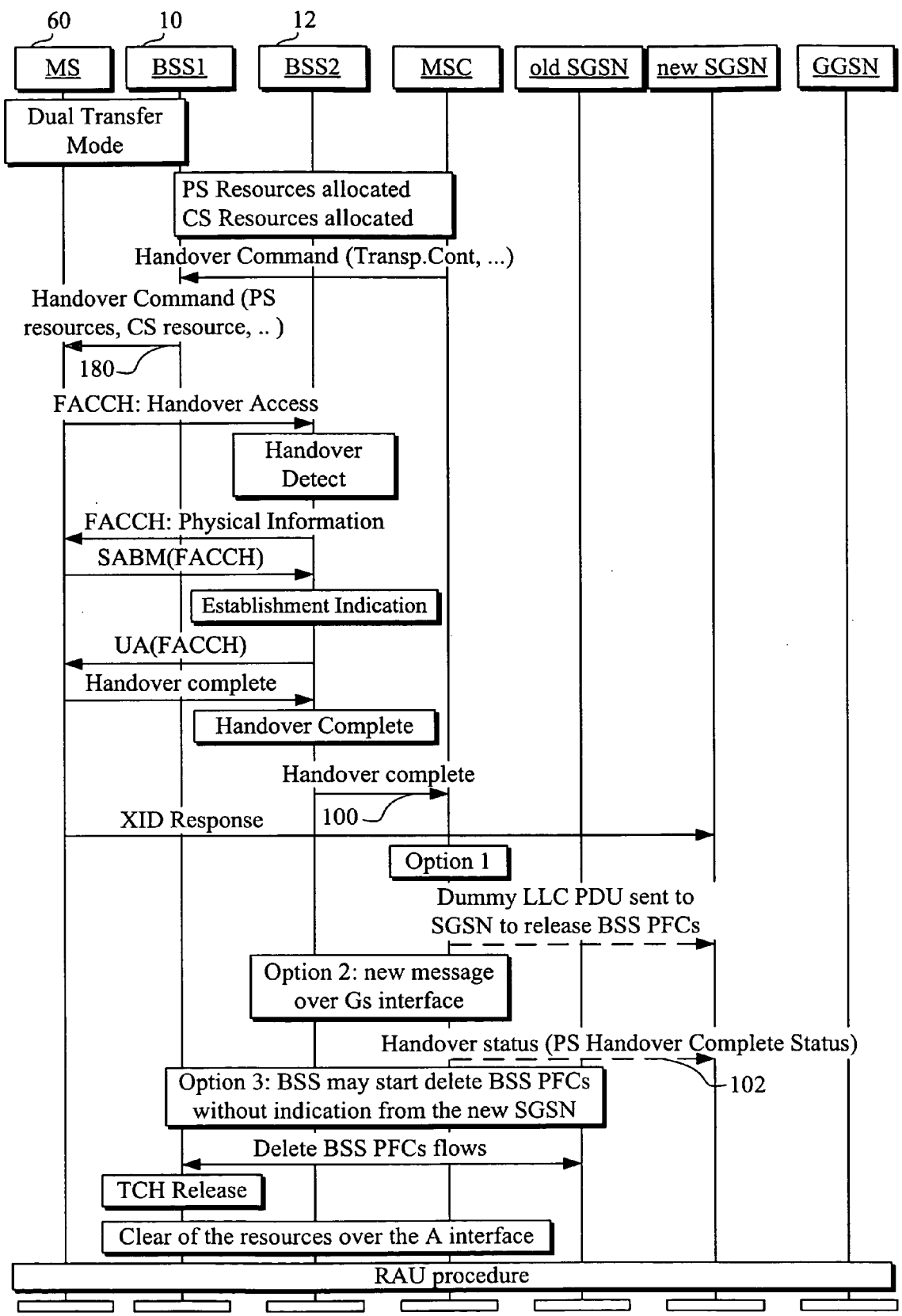
FIG. 8 shows the example of FIG. 7 in an execution phase, according to the present invention, according to the second embodiment of the present invention.

New procedure over Gs interface (between MSC and SGSN) when Gs interface is supported in order to indicate the completion of the handover of the PS resources to SGSN MSC reports the status of the PS resource allocation in the target BSS to the SGSN if a Gs interface is available by means of a new procedure. This new procedure is initiated as shown in FIG. 8 when a HANDOVER COMPLETE message on a line 100 is received by the MSC from the target BSS (BSS2 in FIG. 8). A new Handover Status message on a line 102 is sent from the MSC to the new SGSN only if the information on the availability of the PS resources indicated by a new IE is received at the MSC within the HANDOVER REQUEST ACK message on a line 30 as shown in FIG. 6 which may first go from the BSS2 to the MSC and then from the MSC to the old SGSN over the Gs interface and thence to the new SGSN over the Gn interface (between the old and new SGSNs). After receiving this message an appropriate SGSN may initiate a Delete BSS PFC procedure to the source BSS (BSS1 in FIG. 8) to release the resources in the old cell.

In this case another two alternative solutions are possible, as also shown in FIG. 8:

First solution is to send a Dummy LLC PDU from the MSC to the new SGSN to start the release of the BSS PFCs in the source cell.

Second solution is that the source BSS may start deleting BSS PFC information if the BSS detects user inactivity (see 3GPP TS 48.018).

Additional Functionality over the Gb and Gn Interface

In order to support the handover of the PS resources the following enhancements are hereby recommended to the PS domain procedures over the Gb, Gn, Gs interfaces (Gs is between BSC and SGSN):

BSS side
New triggering point for the Download BSS PFC procedures
SGSN side
New Enhanced SGSN Context procedures over the Gn interface are defined These enhancements are described in detail below:

New triggering action for the Download BSS PFC procedure, over the Gb interface, is defined in this case. The target BSS 12, as shown in FIG. 5, initiates this procedure upon receiving the HANDOVER REQUEST message (CN->BSS) on the line 18 from the MSC within CN 14. The target BSS 12 will have to wait for both the HANDOVER REQUEST message received on the line 18 from the MSC and a CREATE BSS PFC message received on a line 110 from the SGSN also within CN 14 in order to form the HANDOVER REQUEST ACK message on the line 30 (see FIG. 6), sent back to the MSC. The MSC then forwards the radio information contained into the LAYER 3 information transparent container to the source BSS 10 within the HANDOVER COMMAND message (CN->BSS) on the line 40 as also shown in FIG. 6. The transparent container transfers either the HANDOVER COMMAND message with both PS and CS resource indications or the HANDOVER COMMAND message with only a CS resource indication in a case where, e.g., a waiting timer expires in the target BSS or PS resources could not be allocated.

Enhanced SGSN Context procedures

A new procedure for transferring the information from the old SGSN to the new SGSN (over a Gn interface) is defined during the preparation phase of the handover. The new procedure consists of defining two new GTP messages exchanged between the old SGSN to the New SGSN (see FIG. 7).

These two messages are:
1. ENHANCED SGSN CONTEXT REQUEST message on a line 130; and
2. ENHANCED SGSN CONTEXT RESPONSE message on a line 132.

These messages are exchanged between the New SGSN and the Old SGSN. The new SGSN receives a DOWNLOAD BSS PACKET FLOW CONTEXT REQUEST (old RAI, old TLLI, IMSI, Packet Flow Id) message on a line 134 from the target BSS (BSS2 in FIG. 7) as also shown in FIG. 5. If the old TLLI is not available to the BSS, the IMSI has to be sent in this case. The new SGSN may derive the old SGSN from the old RAI and IMSI (or old TLLI) and send the SGSN Context Request message to this old SGSN. Otherwise, the new SGSN derives the old SGSN from the old RAI.

The New SGSN sends ENHANCED SGSN CONTEXT REQUEST (New SGSN Address, IMSI, old TLLI, old RAI) message on the line 130 to the old SGSN in order to download the MM Context and PDP context.

When the new SGSN receives the ENHANCED SGSN CONTEXT RESPONSE message (MM Context, PDP Context, XID parameters (see 3GPP TS 3GPP TS 43.129)) on the line 132 from the old SGSN it then initiates the Create BSS PFC procedures which then allocate the resources in the target BSS. This is shown by a Create BSS PFC message on the line 110 from the new SGSN to the target BSS (BSS2 in FIG. 7) as also shown in FIG. 5, in a slightly different way, from the Target BSS 12 to the CN 14 (which of course includes old and new SGSNs, MSCs, GGSNs, etc.).

Figure 3:
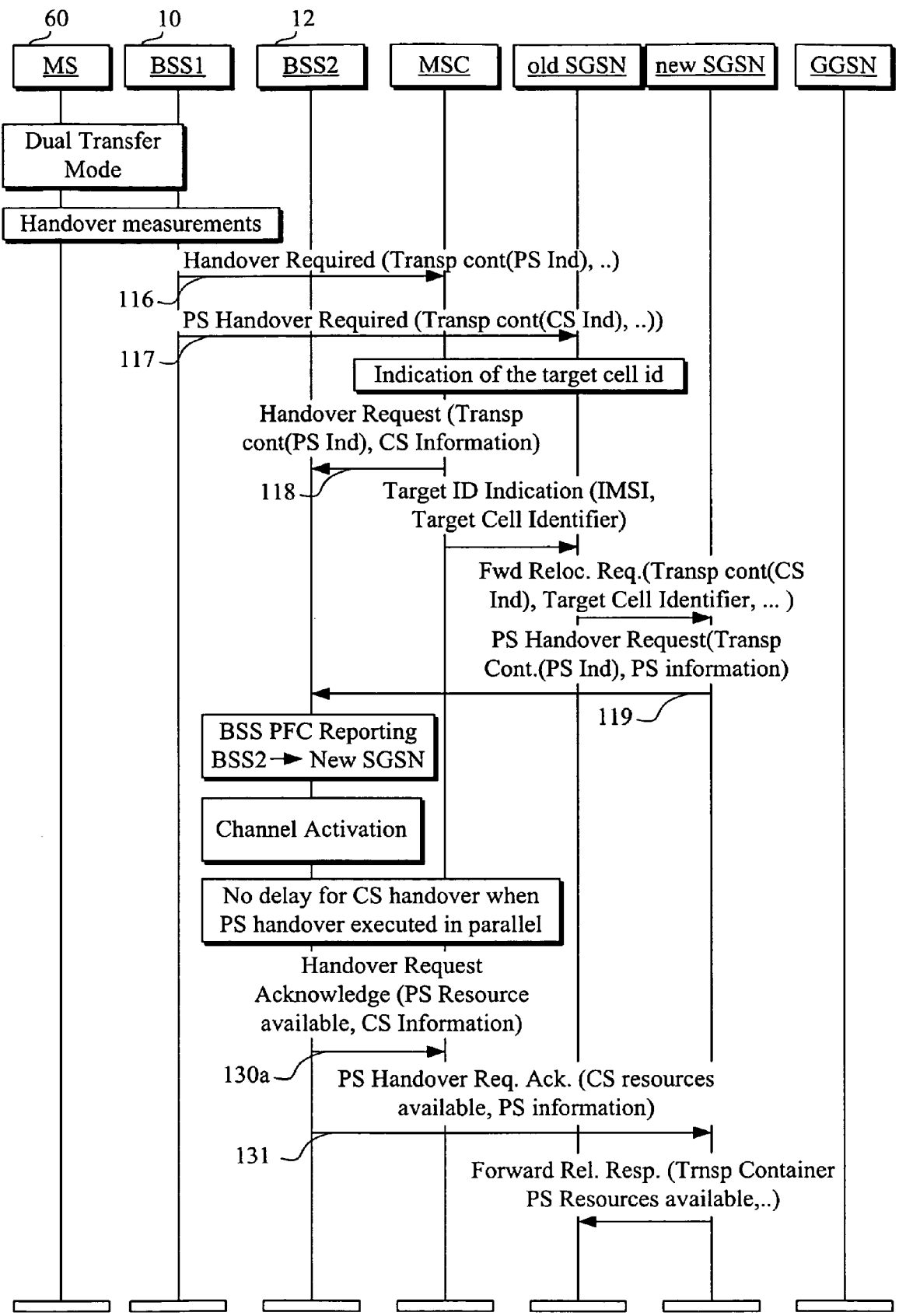
FIG. 3 presents an Inter-BSS, Intra-MSC, Inter-SGSN DTM Handover, Network Mode of Operation (NMO) I, preparation phase, including most of the steps of FIGS. 1 and 2 in a larger context, according to the first embodiment of the present invention.
Figure 9:
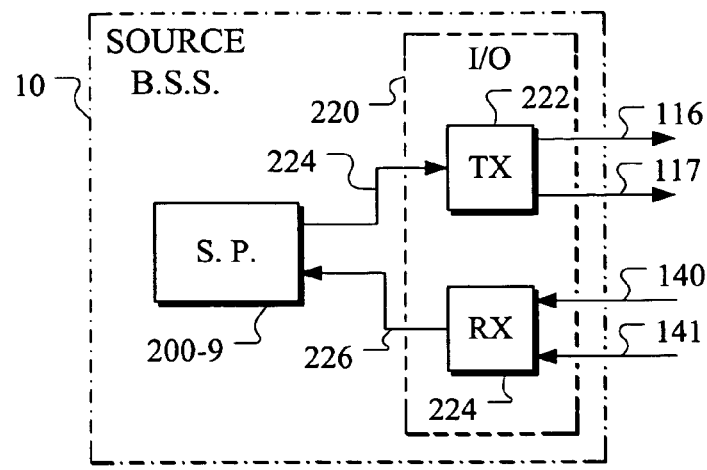
FIG. 9 shows a source BSS according to the first embodiment of the present invention.
Figure 14:
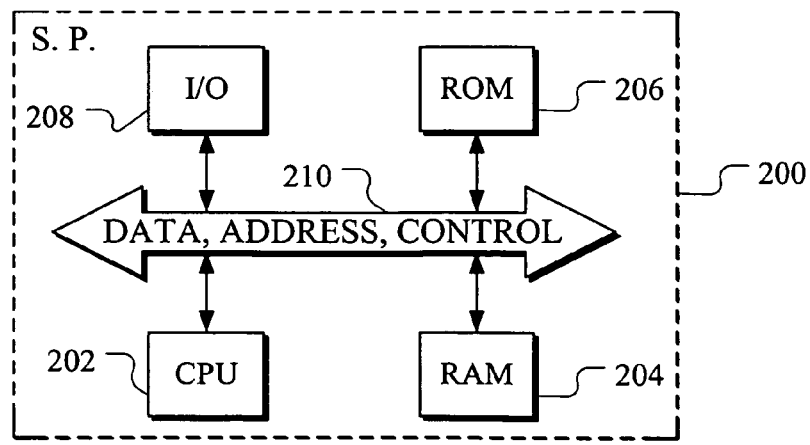
FIG. 14 shows a signal processor which could be used in any of the embodiments of the present inventions as shown for instance in FIGS. 9-13.

FIG. 9 shows a source BSS 10 according to the first embodiment of the present invention interchanging signals with the core network 14 as shown in FIGS. 1-4. The source BSS 10 of FIG. 9 includes a signal processor 200-9 which may be an integrated circuit (in whole or in part) or which may be of the type shown for instance in FIG. 14, without limitation. As such, it may include a central processing unit 202, a random access memory 204, a read only memory 206, an input/output device 208, and a data, address and control bus 210 interconnecting the aforementioned components of the signal processor. In such a signal processor, a set of coded instructions written in a computer programming language are stored on the read only memory (ROM) 206, typically in complied form, i.e., human-readable source code may be compiled into machine-readable instructions and stored on the computer readable medium 206 for retrieval by the CPU 202 for execution in the sequence laid out by the programmer. Of course, the stored code could be interpreted "on-the-fly" instead of complied. Intermediate results and calculations carried out according to the instructions may be stored in a random access memory (RAM) 204 which serves the purpose of storing intermediate results temporarily. The signal processor may be responsive to input signals received by the input/output device 208 for processing and may, in response thereto, provide output signals emerging from the same input/output device or another similar device. The source BSS 10 of FIG. 9 is itself shown having an input/output device 220 which may be different from the input/output device 208 of the signal processor 200 so that it may handle signals of various kinds interfacing with the environment outside the source BSS. As such, it may include a transmitter 222 and a receiver 224. The transmitter 222 is responsive to a signal on a line 224 from the signal processor 200-9 for providing the Handover Required signal on the line 116 and the PS Handover Required signal on the line 117, both of which are shown in FIGS. 1 and 3. The input/output device 220 also includes a receiver 224 that is responsive to the Handover Command signal on the line 140 and the PS Handover Required Acknowledge signal on the line 141 for providing a signal on a line 226 to the signal processor 200-9. In general, the signal processor 200-9 in the source BSS 10 will also be responsive to measurements made by the MS and also by itself concerning the radio environment, particularly as the MS moves about in the cell and as it moves from cell-to-cell. The types of measurement activities carried out by the MS are beyond the scope of the present invention but details thereof can be found for example in the 3GPP specification such as TS 43.055 mentioned above. The details of the radio information as far as handover is concerned is given in 3GPP-TS 24.008 and the relevant network information is given in 3GPP-TS 23.009. In any event, the PS Handover Required message on the line 117 of FIGS. 1 and 3 may contain *Source BSS to Target BSS Transparent Container* information element (IE) carrying a *CS Indication IE* having contents that uniquely identify, for this MS, the handover attempt, and may be identical to the contents of a PS Indication IE included in the *Handover Required* message on the line 116. Similarly, a *Target Cell Identifier* IE may be included in the message to identify the same cell as the one specified in a preferred cell Identifier List information element in the corresponding *Handover Required* message on the line 116. Regarding the signals on the lines 140 and 141 shown in FIG. 9, and received by the receiver 224 and then provided on the line 226 to the signal processor 200-9, the source BSS 10 will wait until it has received both the Handover Command signal on the line 140 and the PS Handover Required signal on the line 141 before stopping the timer 160 and sending the Handover Command signal on the line 180 of FIG. 4 and ending the PS handover required procedure. If the timer 160 of FIG. 2 times out before receiving both signals on the lines 140 and 141 then the source BSS 10 will do one of the following, depending on which signals are received: (1) if the source BSS 10 has received the PS Handover Required Acknowledge signal on the line 141 but not the Handover Command signal on the line 140 and the timer has expired, it may initiate a PS handover cancellation procedure; (2) if the source BSS 10 has received a Handover Command signal on the line 140 but not the PS Handover Required Acknowledge signal on the line 141 and the timer 160 expires, it may send a handover failure message to the MSC with the cause indicated, e.g., "timer expired;" (3) if the source BSS 10 received neither the signal on the line 140 or the line 141 then the handover procedure may be terminated and no message sent to either the MSC or the SGSN; any message or PDU relating to this handover attempt which is received from the MSC or the SGSN after the expiration of the timer 160 may be discarded.

If the source BSS 10 receives a negative acknowledgement in response to the handover required message on the line 116 and a handover required reject message then the handover procedure is terminated and no message is sent to either the MSC or the SGSN.

If the source BSS 10 receives a negative acknowledgement to the PS handover required signal on the line 116 with a cause value indicating an SGSN failure and a handover command message then the source BSS 10 sends a handover failure message to the MSC with the cause of the failure indicated as an "SGSN failure" and no message is sent to the MS.

If the source BSS receives a positive acknowledgement and a handover required reject message then the source BSS 10 initiates a PS handover cancel procedure and no message is sent to the MS.

Thus, this embodiment provides synchronization of the handover of PS and CS resources in the source BSS 10 and in the target BSS 12. The mechanism of synchronizing the handover of the PS and the CS resources in the DTM applies to both CS and PS handover procedures and the mechanism is supported by resource indications on the CS and PS handover signaling to indicate to the target cell network nodes that the CS and PS handover is ongoing at the same time for the same MS.

Figure 7:
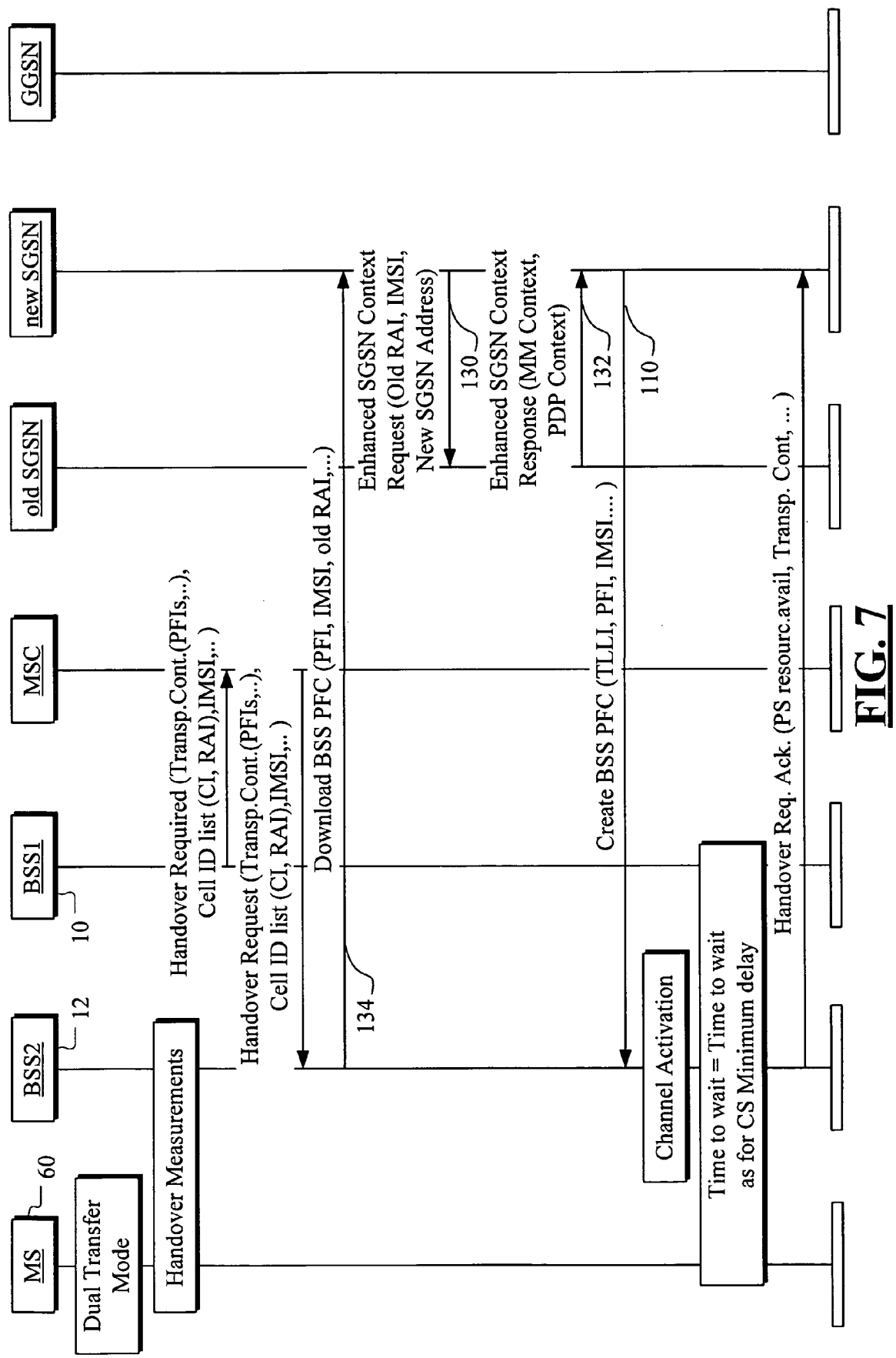
FIG. 7 shows an example of the applicability of the invention for the case when the BSS and SGSN change but the MSC remains the same and a Gs interface is available in a preparation phase, according to the second embodiment of the present invention.
Figure 10:
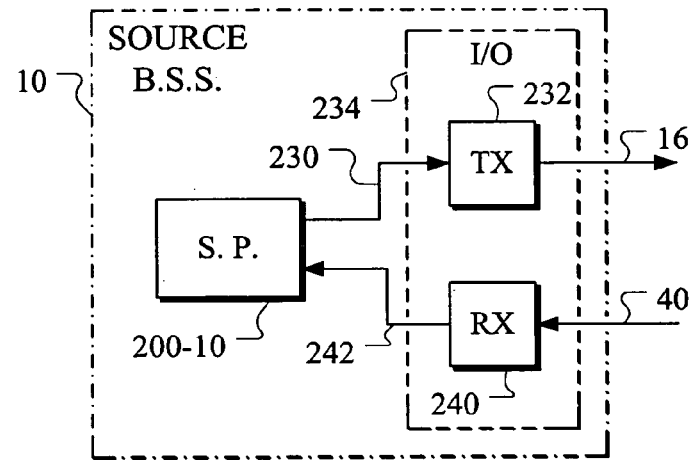
FIG. 10 shows a source BSS according to the second embodiment of the present invention

Referring to FIG. 10, it is similar to FIG. 9 with respect to the source BSS 10 of FIGS. 5 and 6 as well as FIGS. 7 and 8 which all pertain to the second embodiment of the present invention. The source BSS 10 of FIG. 10 includes a signal processor 200-10 which may take the form shown in FIG. 14 as described previously or some other form such as an integrated circuit. The signal processor may provide output signals shown generally by a signal on a line 230 to a transmitter 232 within an input/output device 234. The transmitter device 232 provides the Handover Required signal on the line 16 of FIG. 5 and as also shown in FIG. 7 as being received by the MSC of the core network 14. The Handover Command signal on the line 40 of FIG. 6 is also shown in FIG. 8 sent from the MSC of the core network 14 to the source BSS 10. In FIG. 10, this Handover Command signal on the line 40 is shown being received by a receiver 240 which in turn provides an output signal on a line 242 to the signal processor 200-10. The details of what is carried out in the signal processor 200-10 and the signaling processes associated with FIG. 10 are similar to those already described in connection with FIGS. 5-8 above.

Figure 11:
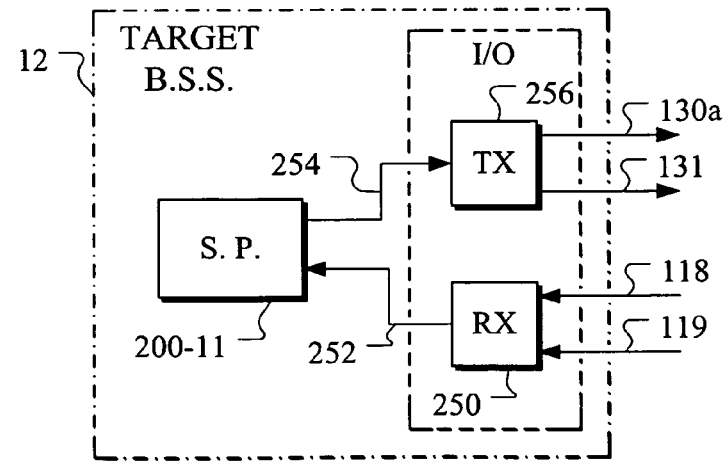
FIG. 11 shows a target BSS according to the first embodiment of the present invention.

FIG. 11 shows a target BSS 12 such as shown in the first embodiment of FIGS. 1 and 2 receiving the Handover Request signal on the line 118 and the PS Handover Request signal on the line 119 (the same signals as shown in FIGS. 1 and 3). These are shown being received by a receiver 250 which in turn provides an output signal on a line 252 to a signal processor 200-11 which may be a chip or may have a structure similar to that shown in FIG. 14. As shown in FIG. 3, the new SGSN is the core network 14 element that sends the PS Handover Request message on the line 119 to the target BSS 12. It includes the NAS container for PS handover corresponding to the PFCs to be set-up (except in the case of intra-SGSN PS handover). As mentioned above, the timer 150 is started in response to the signal on the line 119. Upon receipt of the PS handover request signal on the line 119 containing a CS indication information element (i.e., that a DTM handover procedure is ongoing), then the target BSS 12 can proceed in a number of different ways. First, if the timer 150 is not running then it may start the timer. When both the PS Handover Request message on the line 119 and the Handover Request message on the line 118 are both received and the contents of both the *CS indication* information element and the *PS indication* information element are identical, the target BSS 12 stops the timer 150, attempts to create a new BSS context for the MS, creates PFC's according to the received ABQP (Aggregate BSS QoS Profile) parameters and allocates both dedicated resources and TBF resources within the capabilities of the mobile station (where dedicated resources are allocated for instance as described in 3GPP-TS 48.008). The signal processor provides and output signal on the line 254 to a transmitter 256 that provides the Handover Request Acknowledge signal on the line 130a and the PS Handover Request Acknowledge signal on the line 131. The PS Handover Request Acknowledge message on the line 131 may include a Target BSS to Source BSS Transparent Container i.e., a complete DTM Handover Command message such as described in 3GPP-TS 44.060. In the case of an attempted DTM handover when no shared resources are allocated, the target BSS 12 may continue with the corresponding handover resource allocation procedure, allocating only dedicated resources (see 3GPP-TS 48.008). If the timer 150 expires and the target BSS 12 has received a PS-Handover Request message on the line 119, the target BSS may terminate the PS Handover Request procedure by sending a PS Handover Request Negative Acknowledgement to the SGSN with a cause indicated for instance "timer expiration." The target BSS 12 need only store the mobile station's identity and the CS indication IE for this handover attempt if timer 150 expires. Otherwise, no knowledge of the MS should be kept by the target BSS 12. It should be noted that the duration for which the target BSS stores the MS identity and CS indication E is implementation specific. However, it should be long enough to allow the new BSS to determine whether or not a handover request message corresponds to a previously terminated DTM handover attempt. If the A interface timer 150 expires and the target BSS has received a Handover Request message, the ongoing handover resource allocation fails.

In addition to the case of PS handover, the target BSS may initiate a PS handover complete procedure in case of DTM handover, on receipt of a (RR) handover complete message on the main DCCH in the target cell (see 3GPP-TS 44.018).

Upon reception of the handover request signal on the line 118 as shown in FIG. 11, containing a *PS indication* IE within an *Old BSS* to *New BSS Information* IE, then the target BSS 12 may proceed in a number of different ways. If the target BSS timer is not running, then the target BSS can start it. When a matching pair of handover request message and PS handover request PDU have been received (i.e., the contents of the *CS indication* and *PS indication* IE's are identical), the target BSS 12 may stop its timer and allocate dedicated and (optionally) shared resources (see 3GPP-TS 48.018) respecting the capabilities of the mobile station.

If, in the case of DTM handover, both dedicated and shared resources are allocated, the handover request acknowledge message sent on the line 138 by the target BSS 12 may contain a radio interface message DTM HANDOVER COMMAND within its "Layer 3 Information" information element. The "Layer 3 Information" (which may be either a RR-layer 3 HANDOVER COMMAND or an RLC/MAC-layer 2 DTM HANDOVER COMMAND) is transferred by the controlling MSC to the source BSS using a BSMAP message HANDOVER COMMAND also within the IE "Layer 3 Information" of that BSMAP message. Information about the appropriate new channels and a handover reference number chosen by the new BSS are contained in the HANDOVER COMMAND or DTM HANDOVER COMMAND. Knowledge of the channel in use at the source BSS allows the target BSS to minimize the size of the HANDOVER COMMAND or DTM HANDOVER COMMAND message (i.e., to decide whether the mode of the first channel IE need not be included in the HANDOVER COMMAND).

If the timer expires and the target BSS has received a HANDOVER COMMAND REQUEST message on the line 118 (but no corresponding PS handover request PDU on the line 119, the target BSS may either abort the handover resource allocation procedure by sending a HANDOVER FAILURE message to the MSC with cause "DTM handover-timer expiry," or may continue with the handover resource allocation procedure, allocating only a dedicated resource. In the latter case, the BSS sends a HANDOVER REQUEST ACKNOWLEDGE message on the line 138 to the MSC with the L3 information IE containing an RR handover command message. In either case, the target BSS may store the contents of the PS Indication IE and the identity of the MS. It should be noted that the duration for which the new BSS stores the content of the PS Indication IE is implementation dependent. However, it should be long enough to allow the target BSS to determine whether or not a late PS-handover-request PDU corresponds to a previously terminated DTM handover attempt.

If the timer expires and the target BSS has received a PS HANDOVER REQUEST PDU (but no corresponding HANDOVER REQUEST message), the ongoing PS handover request procedure implicitly fails and the target BSS may send a PS-HANDOVER-REQUEST-NACK PDU to the SGSN with cause "DTN Handover-Timer expiry" (see 3GPP-TS 48.018).

Figure 12:
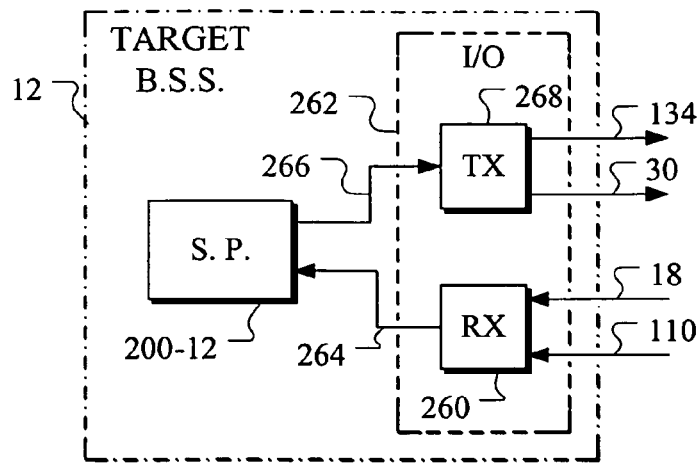
FIG. 12 shows a target BSS according to the second embodiment of the present invention.

Referring now to FIG. 12, it is similar to that already described in connection with FIG. 11 except being applicable to the second embodiment shown in FIGS. 5-8. Thus, a receiver 260 of an input/output device 262 is shown receiving the Handover Request signal on the line 18 in response to which the receiver 260 provides an output signal on a line 264 to a signal processor 200-12 which may take the form shown in FIG. 14 or which may be an integrated circuit (chip). As already described above, the target BSS 12 may send, in response thereto, a download BSS PFC message on the line 134 to the core network 14. Thus, the signal processor 200-12 of FIG. 12 is shown providing a signal on a line 266 to a transmitter 268 within device 262 which in turn provides the download signal on the line 134. In response thereto, the core network provides the Create BSS PFC signal on the line 110 which is shown being received by the receiver 260 and provided on the line 264 to the signal processor 200-12.

The signal processor 200-12 also provides the Handover Request signal on the line 30 as described previously in connection with FIG. 6 in response to a signal on the line 266 from the signal processor 200-12.

Figure 13:
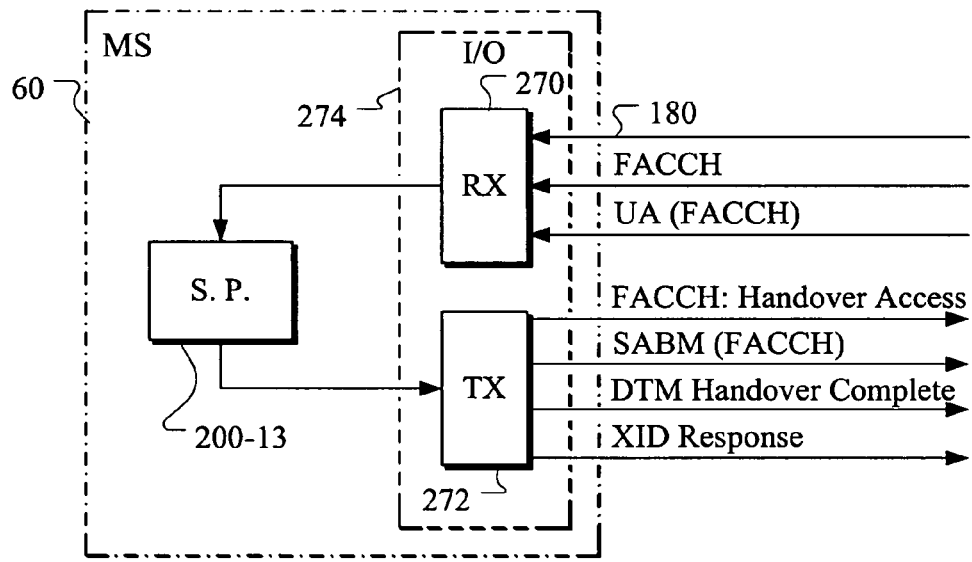
FIG. 13 shows a mobile station according to either the first embodiment or the second embodiment of the present invention.

FIG. 13 shows a mobile station 60 such as the mobile station shown in the two embodiments of the present invention and more particularly as shown in FIGS. 3-4 and 7-8. A signal processor 200-13 is shown which may take the form shown in FIG. 14 while not being limited thereto. I.e., it could take another form such as that of an integrated circuit. The various signals shown already in connection with the previous figures are illustrated in FIG. 13 being received by a receiver 270 or provided by a transmitter 272 and being part of an input/output device 274 within the MS 60. This input/output device 274 is connected to the signal processor 200-13 with as shown so as to be in a position to provide the various input and output signals already illustrated in FIGS. 3-4 and 7-8.

The mobile station 60 may of course take part as an element of a system including the various elements shown in the foregoing figures including the source BSS 10, the core network 14 and its various elements shown in detail in FIGS. 3-4 and 7-8 as well as the target BSS 12.

The invention claimed is:

1. A method, comprising:
   performing a handover of a mobile station having a circuit-switched resource allocated for a circuit-switched connection and a packet-switched resource allocated for a packet-switched connection in a mobile communications system by:
   handing over said circuit-switched resource allocated to said circuit-switched connection of said mobile station, and at the same time,
   handing over said packet-switched resource allocated to said packet-switched connection of said mobile station in a combined simultaneous or parallel handover with said handing over of said circuit-switched resource.

2. A non-transitory computer readable storage medium having a computer program stored thereon having instructions for causing an apparatus to carry out the method of claim 1.

3. The method of claim 1, wherein a packet-switched procedure and a circuit-switched procedure are utilized in parallel to respectively perform said handing over said circuit-switched resource and said handing over said packet-switched resource.

4. The handover method of claim 1, wherein said handing over said circuit-switched resource and said handing over said packet-switched resource are carried out simultaneously.

5. The handover method of claim 1, further comprising permitting the said handing over of said packet-switched resource to said mobile station combined with said handing over of said circuit-switched resource for a limited period after which said method comprises handing over only said circuit-switched resource.

6. The handover method of claim 1 for execution in a radio access network element, comprising:
   sending, when acting as a source radio access network element, one or more first messages to a target radio access network element via a core network, said one or more first messages having indications that said circuit-switched resource and said packet-switched resource are to be handed over from said source radio access network element to said target radio access network element and for receiving one or more second messages from said target radio access network element via said core network, said one or more said second messages indicative of receipt of said one or more first messages, and receiving, when acting as a target radio access network element, said one or more first messages from a source radio access network element via said core network, and for sending said one or more second messages via said core network to said source radio access network element prior to said source radio access network element sending a handover command signal to said mobile station over a radio interface between said source radio access network element and said mobile station for combined handover of said circuit-switched resource and said packet-switched resource.

7. The handover method of claim 6, wherein said sending when acting as a source radio access network element is carried out after determining that handover measurements of a radio interface between said source radio access network element and said mobile station indicate a handover of said mobile station to said target radio access network element is appropriate.

8. The handover method according to claim 7, wherein said one or more first messages sent from said source radio access network element comprise a single message containing indications of said packet-switched resource sent transparently to said core network.

9. The handover method of claim 7, further comprising sending a handover command from said source radio access network element to said mobile station over said radio interface between said source radio access network element and said mobile station.

10. The handover method according to claim 6, wherein said one or more first messages sent from said source radio access network element comprise a single message indicating that both said circuit-switched resource and said packet-switched resource are to be handed over.

11. The handover method according to claim 10, wherein said single message sent from said source radio access network element contain information relating to an old Routing Area Code.

12. The handover method according to claim 10, wherein said single message sent from said source network element is indicative of an international mobile subscriber identity of said mobile station.

13. The handover method according to claim 10, wherein said sending includes sending in said single message from said source radio access network element information relating to an old temporary logical link identity.

14. The handover method of claim 6, wherein a packet-switched procedure and a circuit switched procedure are utilized in parallel to perform both said handing over said packet-switched resource and said handing over said circuit-switched resource.

15. The handover method according to claim 14, wherein said target radio access network element has to wait a time for said one or more corresponding messages from the core network in order to be able to allocate said circuit-switched resource and said packet-switched resource.

16. The handover method of claim 14, wherein messages sent from said source radio access network element to said core network are indicative of said packet-switched resource and said circuit-switched resource to be handed over and wherein a handover command message and a packet-switched handover acknowledge message received by said source radio access network element from said core network are together indicative of packet-switched and circuit-switched resources that are available in said target radio access network element for combined handover.

17. The handover method of claim 16, wherein said source radio access network element has to wait a time for both said circuit-switched handover command message and said packet-switched handover required acknowledge message to arrive in order to be able to send said handover command signal to the mobile station over said radio interface.

18. The handover method according to claim 17, wherein said source radio access network element starts a timer when a first one of said circuit-switched handover command message and said packet-switched handover required acknowledge message arrives.

19. The handover method according to claim 18, wherein said source radio access network element stops said timer when a second one of said circuit-switched handover command message and said packet-switched handover required acknowledge message arrives.

20. The handover method according to claim 14, wherein said one or more corresponding messages comprise a pair of handover request messages, said method further comprising said target radio access network element starting a timer when one message of said pair of handover request messages arrives from the core network.

21. The handover method according to claim 20, wherein said target radio access network element stops the timer when a second one of said pair of handover request messages arrives from the core network.

22. The handover method of claim 14, further comprising sending messages from said target radio access network element to said core network indicating availability of said packet-switched resource in said target radio access network element.

23. The handover method according to claim 14, further comprising sending a download packet flow context message from said target radio access network element to said core network to download a packet flow context.

24. The handover method according to claim 23, wherein said message from said target radio access network contain parameters necessary to download said packet flow context.

25. The handover method according to claim 23, further comprising sending a context request message from a new serving support node to an old serving support node containing necessary parameters to download enhanced serving support node context.

26. The handover method according to claim 25, further comprising sending, in response to said context request message, an enhanced context response message containing a packet data protocol context and a mobility management context from said old serving support node to said new serving support node.

27. The handover method according to claim 25, wherein an allocation of a packet flow context is received by said target radio access network in a message from said new serving support node to said target radio access network for creating a packet flow context in said target radio access network.

28. Radio access network element, comprising:
a transmitter for sending, when acting as a source radio access network element, one or more first messages to a target radio access network element via a core network, said one or more first messages having indications that both a circuit-switched resource and a packet-switched resource are to be handed over, at the same time, in a combined simultaneous or parallel handover from said source radio access network element to said target radio access network element of a corresponding circuit-switched connection and of a corresponding packet-switched connection and a receiver for receiving one or more second messages from said target radio access network element via said core network, said one or more second messages indicative of receipt of said one or more first messages; and said receiver for receiving, when acting as a target radio access network element, said one or more first messages from a source radio access network element via said core network, said transmitter for sending said one or more second messages via said core network to said source radio access network element prior to said source radio access network element sending a handover command signal to a mobile station over a radio interface between said source radio access network element and said mobile station for said combined handover.

29. The radio access network element of claim 28, further comprising:
a timer, for use when said acting as a target radio access network element, responsive to a first one of said one or more first messages for the starting a measurement of a limited time period before which receipt of a second one of said one or more first messages is expected from said source radio access network element via said core network as a condition for carrying out said combined handover.

30. The radio access network element of claim 28, further comprising:
a timer, for use when acting as said source radio access network element for starting a measurement of a limited time period in response to receipt of a first one of said one or more second messages from said target radio access network element via said core network beyond which limit said source radio access network element initiates a sending of a repeat of said one or more first messages to said target radio access network element via said core network.

31. An apparatus, comprising:
a processor; and
memory including computer program code, said memory and said computer program code configured to, with said processor, cause said apparatus at least to:
perform a handover of a wireless terminal having a circuit-switched resource allocated for a circuit-switched connection and a packet-switched resource allocated to a packet-switched connection in a wireless communications network by:
hand over said circuit-switched resource allocated to said circuit-switched connection of said wireless terminal; and
at the same time, hand over said packet-switched resource allocated to said packet-switched connection of said wireless terminal combined in parallel or simultaneously with said hand over of said circuit-switched resource.

32. The apparatus of claim 31, wherein said memory and said computer program code are configured to, with said processor, cause said apparatus to limit a time period within which said hand over of said packet-switched resource may be combined with said hand over of the circuit-switched resource, after which only hand over of the circuit-switched resource is permitted.

33. The apparatus of claim 31, wherein said memory and said computer program code are configured to, with said processor, cause said apparatus to:
send when acting as a source radio access network element, one or more first messages to a target radio access network element via a core network, said one or more first messages having indications that both said circuit-switched resource and said packet-switched resource are to be handed over from said source radio access network element to said target radio access network element and receive one or more second messages from said target radio access network element via said core network, said one or more second messages indicative of receipt of said one or more first messages; and
receive, when acting as a target radio access network element, said one or more first messages from a source radio access network element via said core network, and send said one or more second messages via said core network to said source radio access network element prior to said source radio access network element sending a handover command signal to said wireless terminal over a radio interface between said source radio access network element and said wireless terminal for said combined handover at the same time of said circuit-switched resource and said packet-switched resource.

34. The apparatus of claim 33, wherein said memory and said computer program code are configured to, with said processor, cause said apparatus to:
start, when said acting as a target radio access network element, in response to a first one of said one or more first messages, a measurement of a limited time period before which receipt of a second one of said one or more first messages is expected from said source radio access network element via said core network as a condition for carrying out said combined handover.

35. The apparatus of claim 33, wherein said memory and said computer program code are configured to, with said processor, cause said apparatus to:
start, when acting as said source radio access network element, a measurement of a limited time period in response to receipt of a first one of said one or more second messages from said target radio access network element via said core network beyond which limit said source radio access network element initiates a sending of a repeat of said one or more first messages to said target radio access network element via said core network.

36. An integrated circuit for use in a radio access network element, comprising:
a transmitter for sending, when said radio access network element is acting as a source radio access network element, one or more first messages to a target radio access network element via a core network, said one or more first messages having indications that both a circuit-switched resource and a packet-switched resource are to be handed over, at the same time, of a corresponding circuit-switched connection and of a corresponding packet-switched connection from said source radio access network element to said target radio access network element and a receiver for receiving one or more second messages from said target radio access network element via said core network, said one or more second messages indicative of receipt of said one or more first messages; and
a receiver for receiving, when said radio access network element is acting as a target radio access network element, said one or more first messages from a source radio access network element via said core network, and a transmitter for sending said one or more second messages via said core network to said source radio access network element prior to said source radio access network element sending a handover command to a mobile station over a radio interface between said source radio access network element and said mobile station for combined simultaneous or parallel circuit-switched connection and packet-switched connection handover.

* * * * *